US009683539B2

(12) United States Patent
Calabro (10) Patent No.: US 9,683,539 B2
(45) Date of Patent: Jun. 20, 2017

(54) MULTISOURCE RENEWABLE ENERGY GENERATION

(71) Applicant: David Calabro, Carlsbad, CA (US)

(72) Inventor: David Calabro, Carlsbad, CA (US)

( * ) Notice: Subject to any disclaimer, the term of this patent is extended or adjusted under 35 U.S.C. 154(b) by 0 days.

(21) Appl. No.: 13/887,301

(22) Filed: May 4, 2013

(65) Prior Publication Data

US 2014/0327247 A1 Nov. 6, 2014

Related U.S. Application Data

(60) Provisional application No. 61/642,790, filed on May 4, 2012.

(51) Int. Cl.
| | | |
|---|---|---|
| *F03B 13/00* | (2006.01) | |
| *H02P 9/04* | (2006.01) | |
| *F03B 13/06* | (2006.01) | |
| *F03D 9/00* | (2016.01) | |
| *F03D 9/25* | (2016.01) | |

(52) U.S. Cl.
CPC ............ *F03B 13/06* (2013.01); *F03D 9/002* (2013.01); *F03D 9/007* (2013.01); *F03D 9/008* (2013.01); *F03D 9/25* (2016.05); *F05B 2210/18* (2013.01); *F05B 2220/708* (2013.01); *Y02B 10/30* (2013.01); *Y02B 10/70* (2013.01); *Y02E 10/22* (2013.01); *Y02E 10/725* (2013.01); *Y02E 60/17* (2013.01)

(58) Field of Classification Search
CPC .......... F03B 13/06; F03D 9/002; F03D 9/008; F03D 9/007; F03D 9/00; F03D 9/25; Y02E 60/17; Y02E 10/22; Y02E 10/725; Y02B 10/30; Y02B 10/70; F05B 2220/708; F05B 2210/18

USPC ................. 290/43, 44, 54, 55, 42, 53, 4 C
See application file for complete search history.

(56) References Cited

U.S. PATENT DOCUMENTS

| | | | | | |
|---|---|---|---|---|---|
| 1,596,373 | A | * | 8/1926 | Preston ..................... | 416/194 |
| 4,206,608 | A | * | 6/1980 | Bell .......................... | 60/698 |
| 4,426,846 | A | * | 1/1984 | Bailey ...................... | 60/398 |
| 4,443,707 | A | * | 4/1984 | Scieri et al. ............. | 290/4 R |
| 6,023,105 | A | * | 2/2000 | Youssef .................... | 290/54 |
| 6,861,766 | B2 | * | 3/2005 | Rembert ................... | 290/43 |
| 7,471,010 | B1 | * | 12/2008 | Fingersh ................... | 290/55 |
| 7,956,485 | B1 | * | 6/2011 | Simnacher ................ | 290/55 |
| 8,030,790 | B2 | * | 10/2011 | Kamenov ................. | 290/43 |
| 8,143,740 | B1 | * | 3/2012 | Simnacher ................ | 290/55 |
| 8,436,483 | B2 | * | 5/2013 | Perner et al. ............. | 290/44 |
| 8,482,150 | B2 | * | 7/2013 | Smith ....................... | 290/55 |
| 8,492,918 | B1 | * | 7/2013 | Kamenov ................. | 290/43 |
| 8,899,937 | B2 | * | 12/2014 | Graham .............. | F03D 7/0232 290/55 |

(Continued)

FOREIGN PATENT DOCUMENTS

KR    10-2009-0012739    *    2/2009    ............... H02J 7/02

OTHER PUBLICATIONS

Machine translation of KR10-2009-0012739.*

*Primary Examiner* — Javaid Nasri (57) ABSTRACT

A multisource generator system and associated processes generate electricity using one or more of wind power, hydropower, mechanical power, and solar power. The power sources may be selectively attached and activated to generate the electricity. A rotor may be actuated in response to both the wind power and the hydropower. The mechanical power may further actuate the rotor.

1 Claim, 11 Drawing Sheets

(56) References Cited

U.S. PATENT DOCUMENTS

| | | | |
|---|---|---|---|
| 2010/0060008 A1* | 3/2010 | Hostetler | F03B 17/067 290/54 |
| 2010/0078942 A1* | 4/2010 | Bois | F03D 9/00 290/54 |
| 2011/0095538 A1* | 4/2011 | Tabe | 290/55 |
| 2011/0101794 A1* | 5/2011 | Schroeder et al. | 307/150 |
| 2012/0175884 A1* | 7/2012 | Hein | 290/55 |

* cited by examiner

MULTISOURCE RENEWABLE ENERGY GENERATION

I. CLAIM OF PRIORITY

This application is a continuation patent application of, and claims priority from, U.S. Provisional Patent Application Ser. No. 61/642,790, filed on May 4, 2012 and entitled, "Energy Production Using Turbine Blade Responsive to Both Wind and Water Forces," which is incorporated by reference herein in its entirety for all purposes.

II. FIELD OF THE DISCLOSURE

The present disclosure relates generally to power generation, and more specifically, to power generation using alternative energy sources.

III. BACKGROUND

Renewable energy sources, such as solar power, wind power, and hydropower continue to hold promise for providing an environmentally and fiscally responsible alternative to fossil fuels. Despite the advantages of using alternative energy sources, obstacles to their implementation persist. For example, the effectiveness of conventional renewable energy systems may be subject to weather and seasonal-related fluctuations. Additionally, conventional resource generation systems may be bulky, immobile, and difficult to scale.

IV. SUMMARY OF THE DISCLOSURE

In a particular embodiment, a method of producing electrical power includes configuring a rotor to rotate in response to force produced using at least two of wind power, hydropower, and mechanical power. Electricity is generated through rotation of the rotor.

A turbine blade may be attached to the rotor. The turbine blade may be configured to translate the force to the rotor, and wherein the turbine blade is responsive to at least one of the wind power and the hydropower. At least one of the turbine blade and the rotor includes a hollow portion. The turbine blade may be detachable.

An embodiment may further enable hand generated power to be communicated to the rotor. An illustrative method may include directing water to a turbine blade that is in mechanical communication with the rotor. A water storage reservoir may be positioned in such a manner as to direct water to a turbine blade in mechanical communication with the rotor. The electricity may be used to run a water pump that pumps water to the water storage mechanism. Water associated with the hydropower may be purified by an embodiment of the method.

The rotor and a turbine blade may be attached to a portable or fixed frame. Likewise, a solar panel may be connected to the frame. Power from a solar panel may be used to supply a water pump, as discussed herein.

Inverter circuitry, which may include a micro-inverter, may be configured to perform at least one of converting direct current to alternating current, receiving external power from an external power source, and providing the electricity to a battery, such as via a universal serial bus (USB) or other computer port.

According to another particular embodiment, a method of producing electrical power includes attaching at least three power sources to a circuit associated with a frame. The plurality of power sources may include: a wind power source, a hydropower source, a mechanical power source, and a solar power source. Electricity is generated using the circuit.

At least two of the wind power source, the hydropower source, and the mechanical power source may be attached to a rotor. A turbine blade may be attached to the rotor. The turbine blade may be responsive to both the wind power source and to the hydropower source. Where so configured, a carrying mechanism may be attached to the frame.

According to another particular embodiment, a method of producing electrical power includes configuring a rotor to rotate in response to force produced using multiple power sources that use at least two of wind power, hydropower, and mechanical power. At least two of the multiple power sources are detachably connected to the rotor, and electricity is generated through rotation of the rotor.

A detachable solar power source may be attached to a frame housing the rotor. A turbine blade may be attached to the rotor. The turbine blade may be configured to translate the force to the rotor. The mechanical power source may be removably attached so as to be in mechanical communication with the rotor.

Embodiments of the multisource renewable power generation system enable extended flexibility and usefulness, when compared to conventional power generation techniques. By enabling different sources of potential green energy, embodiments reduce the variability traditionally associated with wind, solar, hydro and other alternative energy sources. Embodiments may be scalable to meet different needs, and energy sources may be added to existing systems as desired. Optionally, some of the electricity produced by an embodiment may be used to purify water or store potential energy for future use. An inverter of an embodiment may be used to convert direct current to alternating current. An embodiment of the inverter may include an additional input to directly connect existing solar panels and may allow for the addition of panels at any time with reduced cost. The modular construction of an embodiment may further decrease variability by enabling different energy sources to be fastened and wired to a common frame.

Features that characterize embodiments are set forth in the claims annexed hereto and forming a further part hereof. However, for a better understanding of embodiments, and of the advantages and objectives attained through their use, reference should be made to the drawings and to the accompanying descriptive matter.

VI. DETAILED DESCRIPTION

An embodiment of a multisource generator system generates electricity using one or more of wind power, hydropower, mechanical power, and solar power. The power sources may be selectively attached and activated to generate the electricity. A particular embodiment includes a rotor that is moved in response to both the wind power and the hydropower. The mechanical power may further actuate the rotor.

A particular embodiment includes a hybrid turbine that spins and produces electricity with either wind or water forces, such as rainwater. The system may include a gearless rotor and stator, though another embodiment may include gears. The rotor may include blades of a turbine and mounted permanent magnets set into a chassis. Other embodiments may use different types of magnets. The rotor blades may catch the wind from either direction, causing spinning around the stator on an axle and the generation of current.

The turbine may additionally generate current from the flow of water. The turbine of an embodiment may be situated on a side of a permanent or temporary structure and may be fed by gutter system or tarp. When it rains, the resulting water may be directed towards the blades of the rotor causing them to spin and create current. Other embodiments may use other sources of moving water, including stored water.

The design of an embodiment of the turbine may be compact and portable for transport considerations. For instance, a handle may be incorporated into the design to facilitate carrying or mounting. Another embodiment may be implemented on a much larger scale, such as part of a building.

An embodiment may include a water storage bladder system that is positioned above the turbine. The bladder may fill with rain from a gutter, tarp, stream, or other source of water. When installed and tilted at an angle, gravity may force the water to a lower portion of the bladder that may be directed and released to spin the rotor of the turbine. The bladder may thus allow for the generation of additional electricity after it has stopped raining. The water of an embodiment may be released using a timer and an automated actuator, so as to generate electricity during peak hours. The water can also be stored to be used at any time either as energy, or as a source of clean water for drinking or gardening, among other uses. A nipple may be located at the base of the bladder that may be unscrewed and a water filter may be incorporated. The end of the nipple may include an attachment for a standard size hose. The hose may be connected and selectively blocked at the ground level by a nozzle. Whenever the nozzle is unblocked, or opened, the resulting water may be forced through the filter and into the hose for use. Optionally, some of the electricity produced by an embodiment may be used to purify water using an electrically powered water purifier, such as a germicidal ultraviolet light or reverse osmosis system. The availability of electricity to purify water offers more flexibility when choosing a filter or a filtering method. Purification may similarly be enabled during or after a power outage or in another situation when electricity is unavailable.

When the bladder of an embodiment is full, the water may overflow up the same opening and spill back into the gutter, and down towards the turbine. According to another particular embodiment, a second water storage system may be positioned at ground level. Electricity generated using solar or wind power (or a battery or other external power source) may be used to run an electric water pump. When water in the upper water storage system is less than full (e.g., a preset threshold level), the pump may move the water from the ground level storage system to the upper level storage system where it can be released at anytime. Optimally, the hydropower may be utilized when there is no other current being produced from the sun, wind, or rain. Therefore this transfer of energy from the variable sources of sun and wind, to the predictable and reliable form of stored water up high, serves to provide more constant and evenly distributed electricity from the variable sources of the sun and wind.

An inverter may convert direct current (e.g., generated using solar power) to alternating current. An embodiment of the inverter may include an additional input to directly connect existing solar panels and may allow for the addition of panels at any time. With the installation of the inventor, the panels may be added simply, at any time, and with reduced cost. Inclusion of the solar power also adds the flexibility to produce more electricity, and under more variable conditions.

In many instances, renewable energy is variable and depends on the amount of sun or wind available. With the addition of hydropower and/or mechanical (e.g., hand crank or pedal power), the combination of multiple power elements may allow for greater flexibility and power generation under different conditions than any single component. The addition of stored energy in the form of water up high may further help to reduce the variability of the sources. These features may address the issue of variability with respect to renewable energy sources.

Figure 1:
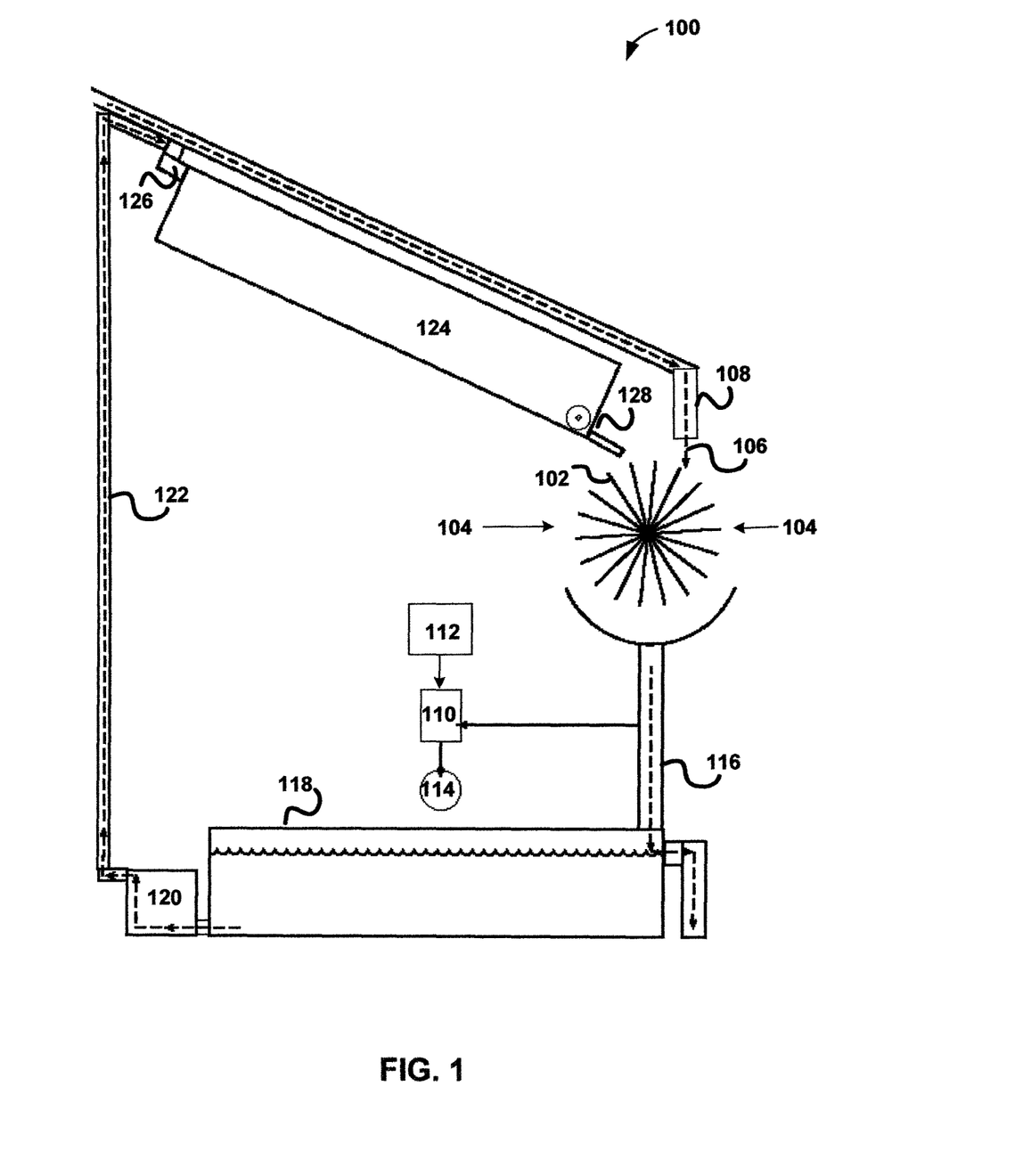
FIG. 1 shows an embodiment of a multisource renewable energy generation system that includes a turbine that is responsive to both wind power and hydropower.

Turning more particularly to the Drawings, FIG. 1 shows an embodiment of a multisource renewable energy generation system 100 that includes a turbine 102 that is responsive to both wind power and hydropower. More particularly, the turbine 102 may rotate in either direction according to the direction of the wind 104, and may be further spun by water 106 flowing from a water source, such as a gutter 108. A water source of another embodiment may include a tarp used to catch rainwater. The turbine 102 may additionally be positioned such that it is actuated from falling rain.

Direct current generated from the turbine movement may be supplied to inverter circuitry 110, which may include a micro-inverter. The inverter 110 may convert the direct current to alternating current. Where so desired, the inverter circuitry 110 may receive electricity from a solar power source 112. The inverter circuitry 110 may be coupled to a power module 114. The power module 114, which may include a battery or electrically powered machine, may receive the electrical current.

The water flowing from the turbine 102 may be captured and directed via a downspout 116 into a secondary water storage tank 118. Excess water levels in the storage tank 118 may result in the overflow of water back into the downspout 116.

An electric water pump 120 may pump water via a conduit 122 from the water storage tank 118 into the gutter 108 or bladder system 124. The electric water pump 120 may be powered by electricity supplied from the inverter circuitry 110 (e.g., electricity generated by rotation of the turbine 102 and by the solar power source 112). The bladder system 124 may include a bladder overflow mechanism 126 that allows water from the bladder system 124 to flow back into the gutter 108. The bladder system 122 may additionally include a bladder outlet 128 that may selectively release water back onto the turbine 102.

Figure 2:
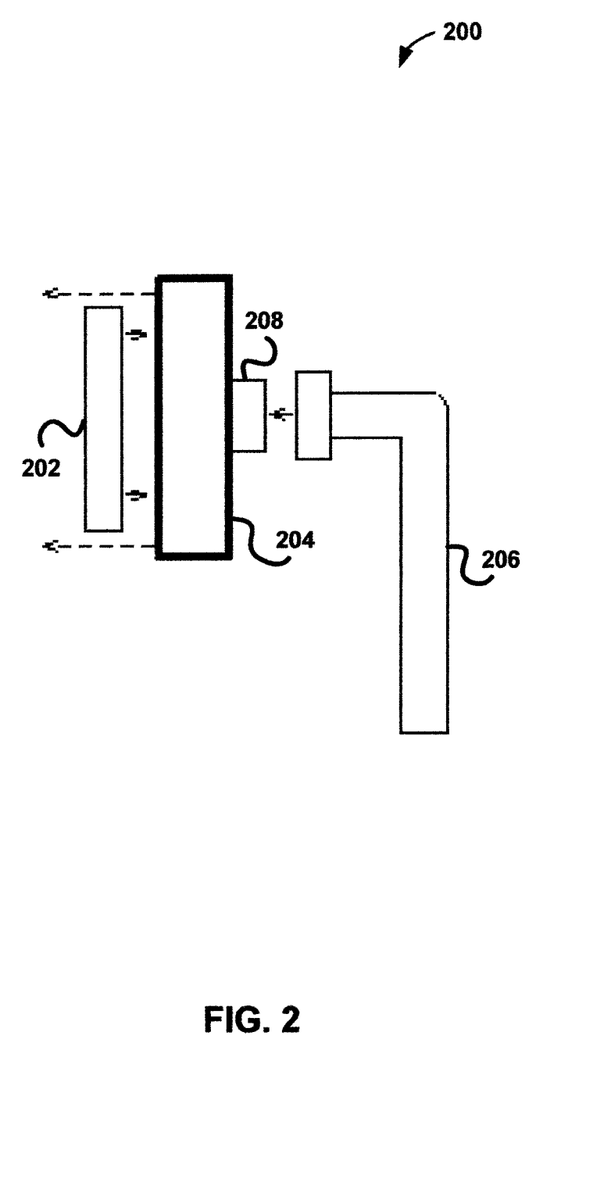
FIG. 2 shows a bladder system, such as may have application in the embodiment of FIG. 1.

As shown in FIG. 2, an embodiment of a bladder outlet 200 may include a water filter 202. The bladder outlet 200 may be similar to the bladder outlet 128 of FIG. 1. An embodiment of a water filter 202 may be inserted inside a cap mechanism 204 that attaches to the bladder reservoir. A hose, pipe, or other conduit 206 may attach to the cap mechanism 204 via an attachment mechanism 208.

Figure 3:
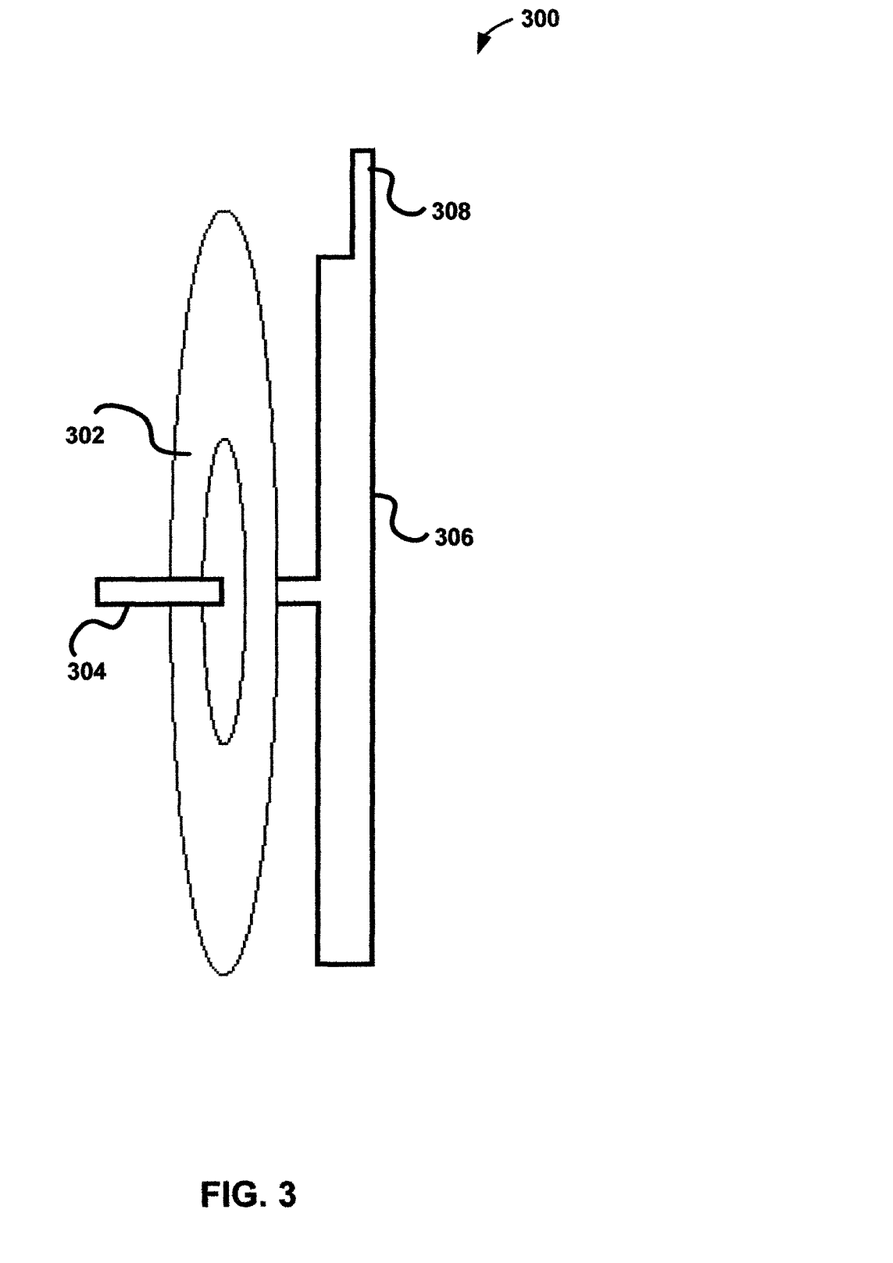
FIG. 3 shows an embodiment of a turbine assembly, such as may have application in the embodiment of FIG. 1.

FIG. 3 illustrates an embodiment of a turbine assembly 300. The turbine assembly 300 may be similar to the turbine 102 in the embodiment of FIG. 1. The turbine assembly 300 may include a rotor 302 (shown without blades) that is mounted on an axle 304. The axle 304 may be attached to a stator 306. The stator 306 may include wound copper wires. A handle mount 308 may be included as a component of the turbine assembly 300.

Figure 4:
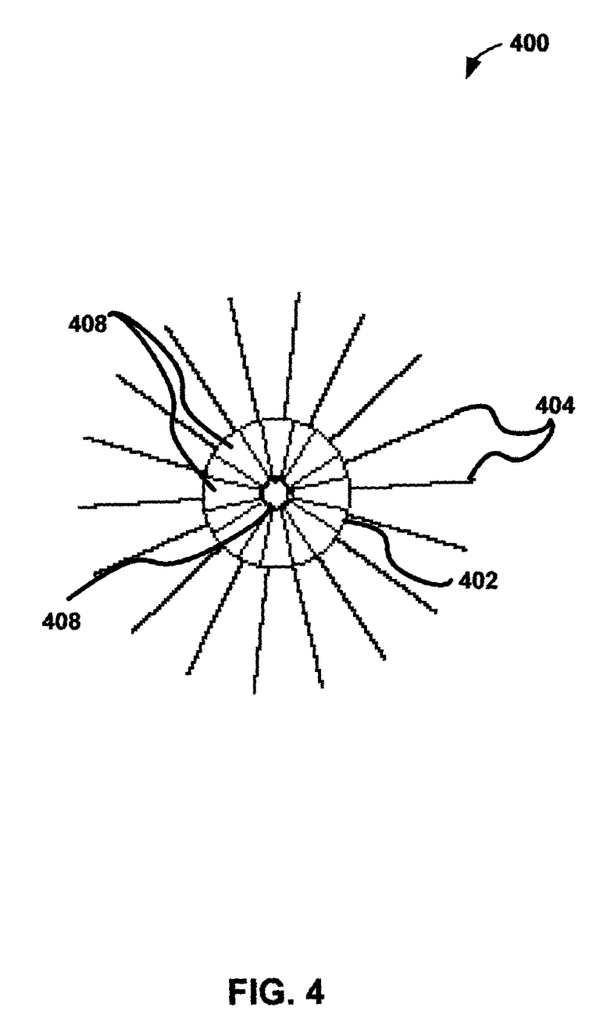
FIG. 4 shows a side view of an illustrative turbine assembly.

FIG. 4 shows a side view of a turbine assembly 400. The turbine assembly 400 may be similar to the turbine 102 of FIG. 1 and/or the turbine assembly 300 of FIG. 3. The turbine assembly 400 may include a rotor 402 mounted on an axle 408. Blades 404 may be attached to the rotor 402. The rotor 402 may comprise a wire chassis with mounted magnets 406. The mounted magnets 406 may be positioned on one or both flat surfaces of the rotor 402 or may be mounted inside.

Figure 5:
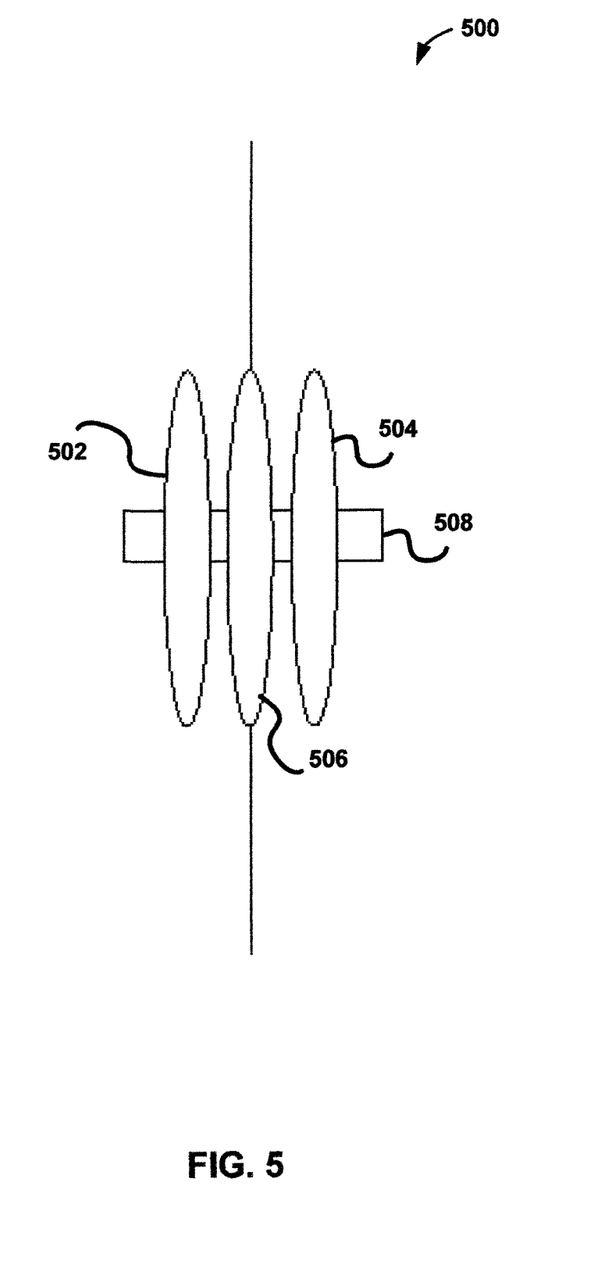
FIG. 5 shows block diagram of a turbine assembly having dual stators, such as may have application in the embodiment of FIG. 1.

FIG. 5 shows block diagram of a turbine assembly 500 having dual stators 502, 504. A rotor 506 may be similar to the rotor 402 of FIG. 4, having magnets on either side facing the stators 502, 504. The rotor 506 may spin on an axle 508. The turbine assembly 500 may be similar to the turbine 102 of FIG. 1. The turbine assembly 400 may include a rotor 402 mounted on an axle 408. Blades 404 may be attached to the rotor 402. Magnets 406 may be positioned on one or both flat surfaces of the rotor 402. Of note, a crank or other human powered/mechanical actuation mechanism may be made to be in mechanical connection with either the axle 505 or the rotor 506, or both, for translating physical force into manual rotation.

Figure 6:
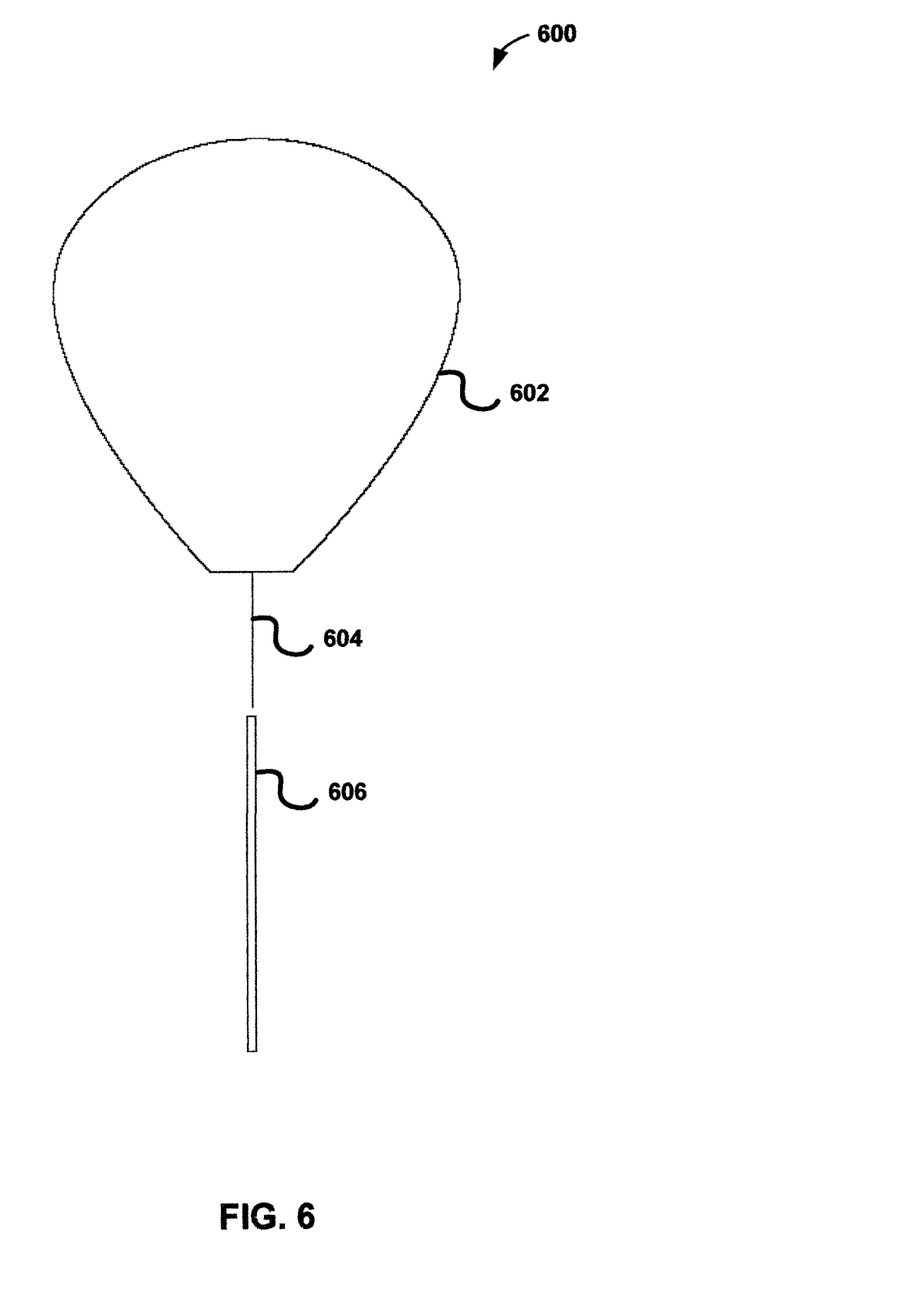
FIG. 6 shows an embodiment of a blade that includes a fan blade that is connected to a shaft.

FIG. 6 shows an embodiment of a blade 600 that includes a fan blade 602 that is connected to a shaft 604. The shaft 604 may detachably connect to a rotor 606. For example, the shaft 604 may fit or screw into a socket of the rotor 606. The blade 600 may be similar to the blade 404 shown in FIG. 4. The fan blade 602 may comprise a wire frame that is covered in a cloth-like, weatherproof sleeve.

Figure 7:
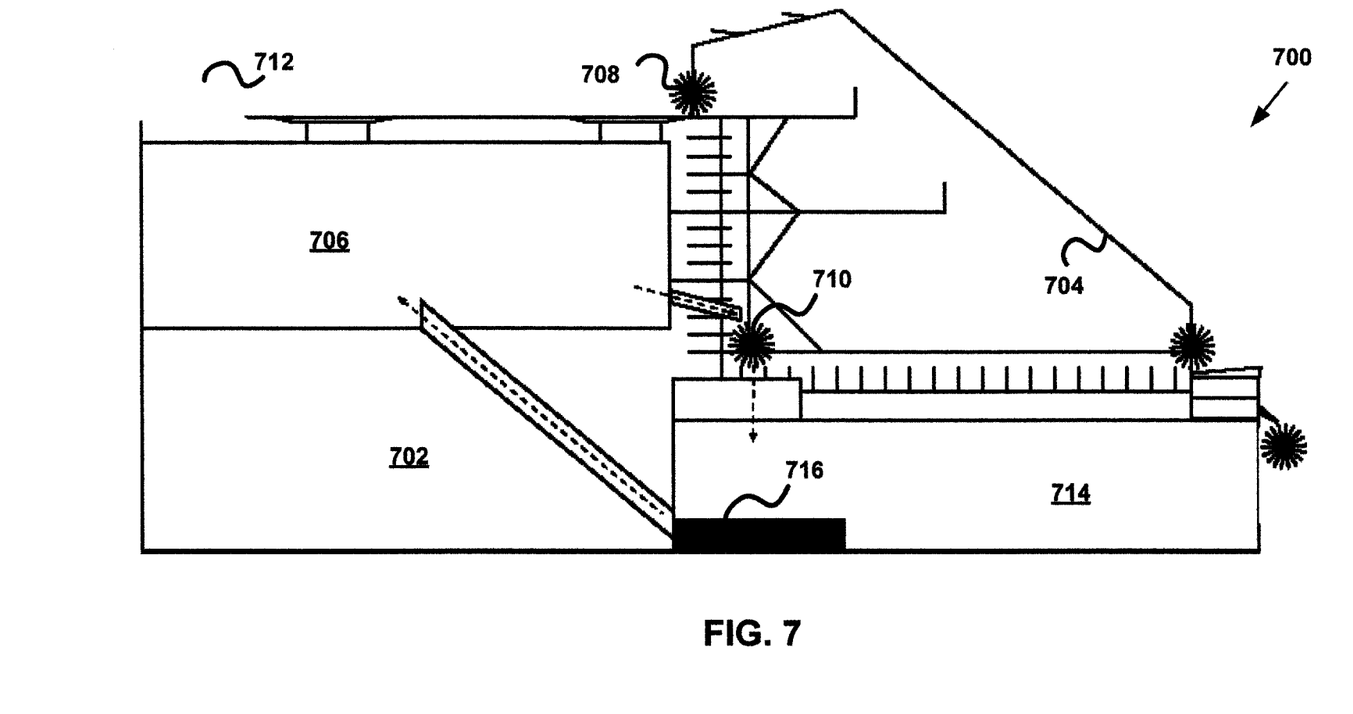
FIG. 7 shows an embodiment of a large dwelling structure that includes multiple renewable power sources.

FIG. 7 shows an embodiment of a large dwelling structure 700 that includes multiple renewable power sources. The structure 700 may utilize the constant temperature of the earth (geothermal heat energy) to maintain a desired interior temperature. An outer portion 704 of the structure 700 may include transparent glass having a thin film layer applied. The film layer may lighten or darken between transparent and opaque (and all shades between) in response to a small electric current. This feature may provide additional heating and cooling of the interior of the structure 700 using solar energy/light with the flip of a switch or automatically according to a sensor. The opaque setting may block the entry of light for cooling, and more transparent settings may allow light and heat to enter. Additionally, a heat pump may be used to further achieve a specific temperature.

Electricity may be provided by solar panels, wind, and hydropower. The site location may use gravity and the natural decline of a hill, mountain, or graded area to direct and control the flow of water to a storage area. After a rain, all water from the top of the mount on down to the site location may be directed into a water storage area 706. The larger the surface area of the land, the more water may be collected, and the quicker the storage area 706 may fill. Water may be released at any time to spin turbines 708, 710 to produce current. At least one of the turbines 710 may be situated below the water level of the stored water. The turbines 708, 710 may spin with wind and the water to produce current. Interior plumbing may utilize gravity and the stored water for use and/or filtration.

A roof 712 of the structure 700 may be tilted so that the entire surface area may direct any rainfall into gutters and the into a combination hydropower and wind power-operated turbine on its way to the water storage area 706. Water may be pumped from a lower water storage area 714 to the higher water storage area 706 for release as needed. A water pump may be operated using electricity generated by movement of the turbine.

Figure 8:
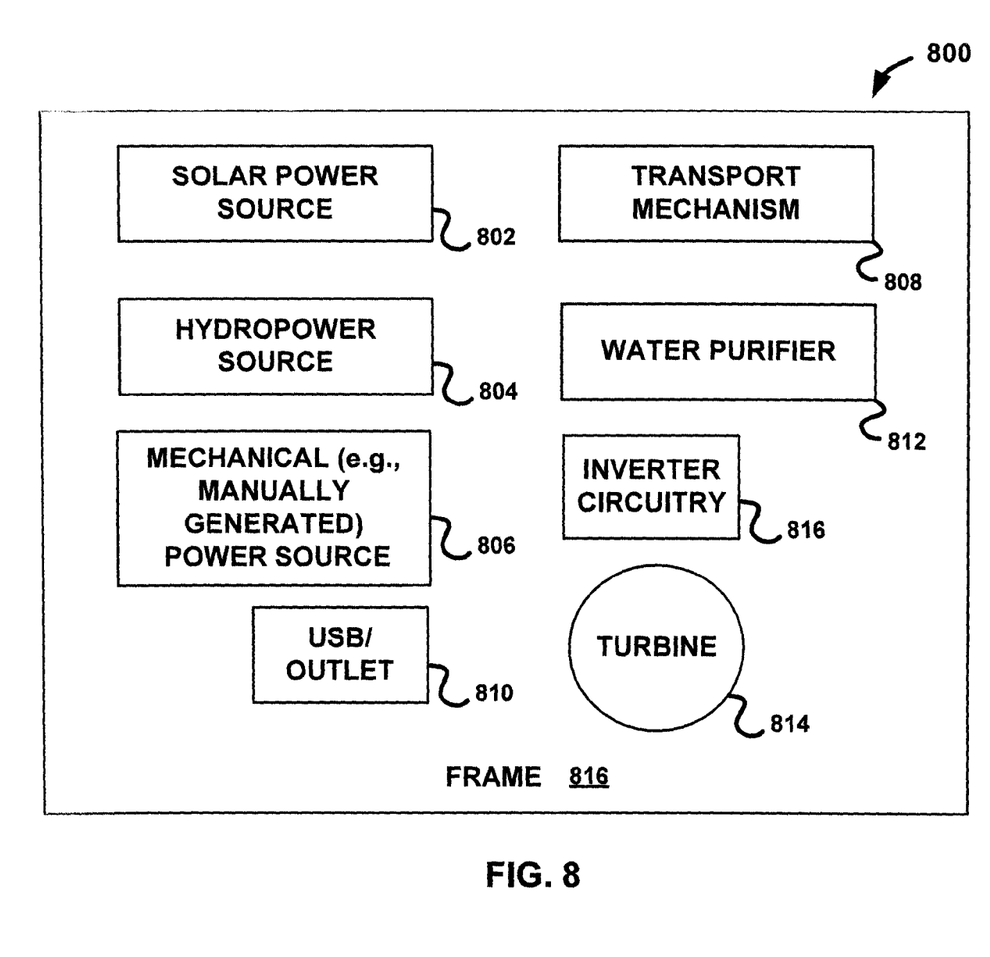
FIG. 8 shows a block diagram of an electricity producing system that selectively incorporates wind power, hydropower, solar power, and mechanical power sources.

FIG. 8 shows a block diagram of an electricity producing system 800 that selectively incorporates wind power (not shown), hydropower 802, solar power 804, and mechanical power sources 806. The system 800 additionally may include a transport mechanism 808, such as a handle or cargo lift, and USB or other power outlet 810. A water purifier 812 may be included, as well. An illustrative solar power 804 may incorporate film and sheet sized technology, and the frame 816 may range in size from a hand carried structure to grid framework for a network of buildings.

An embodiment of the system 800 may be modular in that the different modules 802, 804, 806, 808, 810, 812, 814 may be selectively attached to or removed from a frame 816 in a modular fashion, e.g., using screws, bolts, slide and groove, and or other known fasteners). For example, an embodiment of the system 800 may include plug and play modularity in that power source modules 802, 804, 806, 808, 810, 812, 814, 816 may be added without significant wiring or assembly. For instance, modules 802, 804, 806, 808, 810, 812, 814 may be added without having to add an additional inverter (e.g., in addition to the inverter 816 that is shared by the modules 802, 804, 806, 808, 810, 812, 814). The turbine 814 may be connected to a standard 120 volt or 240 volt outdoor AC outlet, as opposed to connecting to the power meter of a structure and relying on a utility company and/or the assistance of an electrician. The modularity may further enable aftermarket sales opportunities where a consumer may selectively add and replace modules 802, 804, 806, 808, 810, 812, 814 as prompted by changing circumstances.

Figure 9:
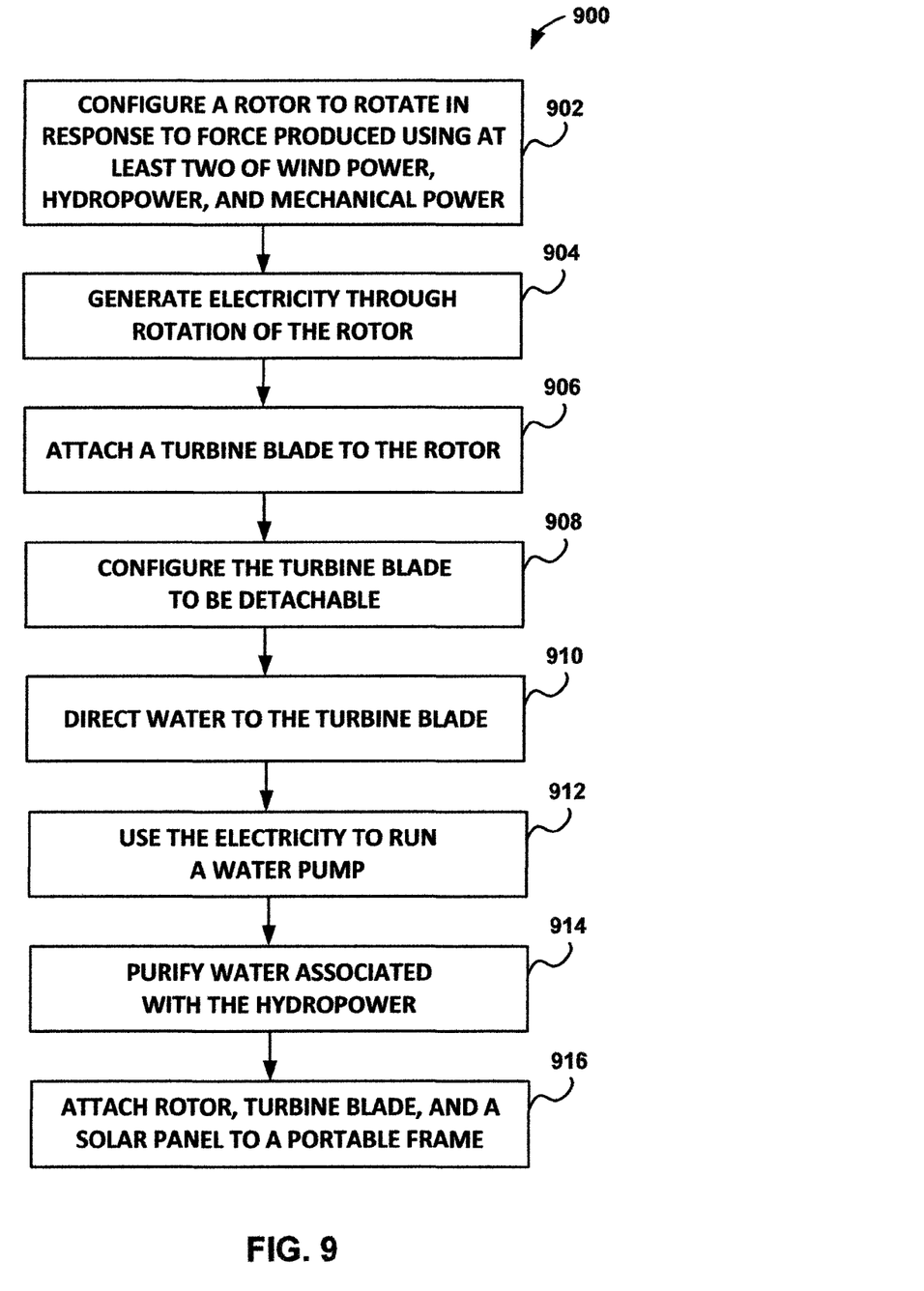
FIG. 9 is a flowchart illustrating an embodiment of a method of producing electrical power.

FIG. 9 is a flowchart illustrating an embodiment of a method of producing electrical power. At 902, a rotor may be configured to rotate in response to force produced using at least two of wind power, hydropower, and mechanical power. Electricity may be generated at 094 through rotation of the rotor.

A turbine blade may be attached to the rotor at 906. The turbine blade may be configured to translate the force to the rotor and may be responsive to at least one of the wind power and the hydropower. At least one of the turbine blade and the rotor may include a hollow portion.

At 908, the turbine blade may be configured to be detachable. Water may be directed at 910 to the turbine blade. The turbine blade may be in mechanical communication with the rotor. According to a particular embodiment, a water storage reservoir may be used to direct water to the turbine blade. The electricity may be used at 912 to run a water pump that pumps water to the water storage mechanism. At 914, water associated with the hydropower may be purified. The rotor, a solar panel, and a turbine blade may be attached at 916 to a portable frame. Energy generated by the solar panel may be used to supply a water pump. As discussed herein, another embodiment of a method may allow a mechanically driven power source, such as a hand crank or bicycle pedal contraption, to be attached to the frame.

Figure 10:
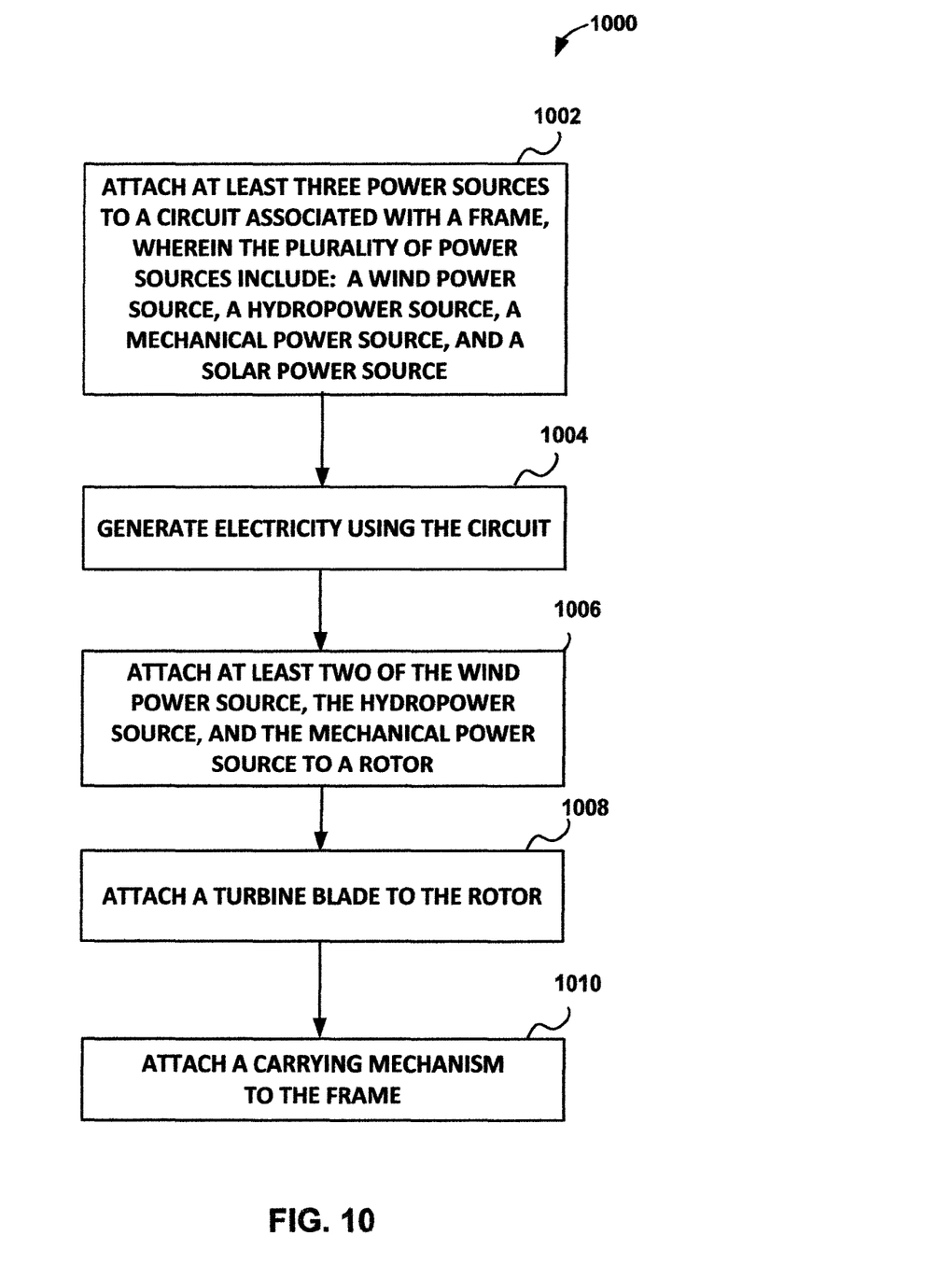
FIG. 10 is a flowchart illustrating an embodiment of another method of producing electrical power.

FIG. 10 is a flowchart illustrating an embodiment of another method of producing electrical power. At 1002, at least three power sources may be attached to a circuit associated with a frame. The plurality of power sources may include: a wind power source, a hydropower source, a mechanical power source, and a solar power source. Electricity may be generated at 1004 using the circuit.

At 1006, at least two of the wind power source, the hydropower source, and the mechanical power source may be attached to a rotor. A turbine blade may be attached to the rotor at 1008. The turbine blade may be responsive to both the wind power source and to the hydropower source. A carrying mechanism may be attached to the frame at 1010.

Figure 11:
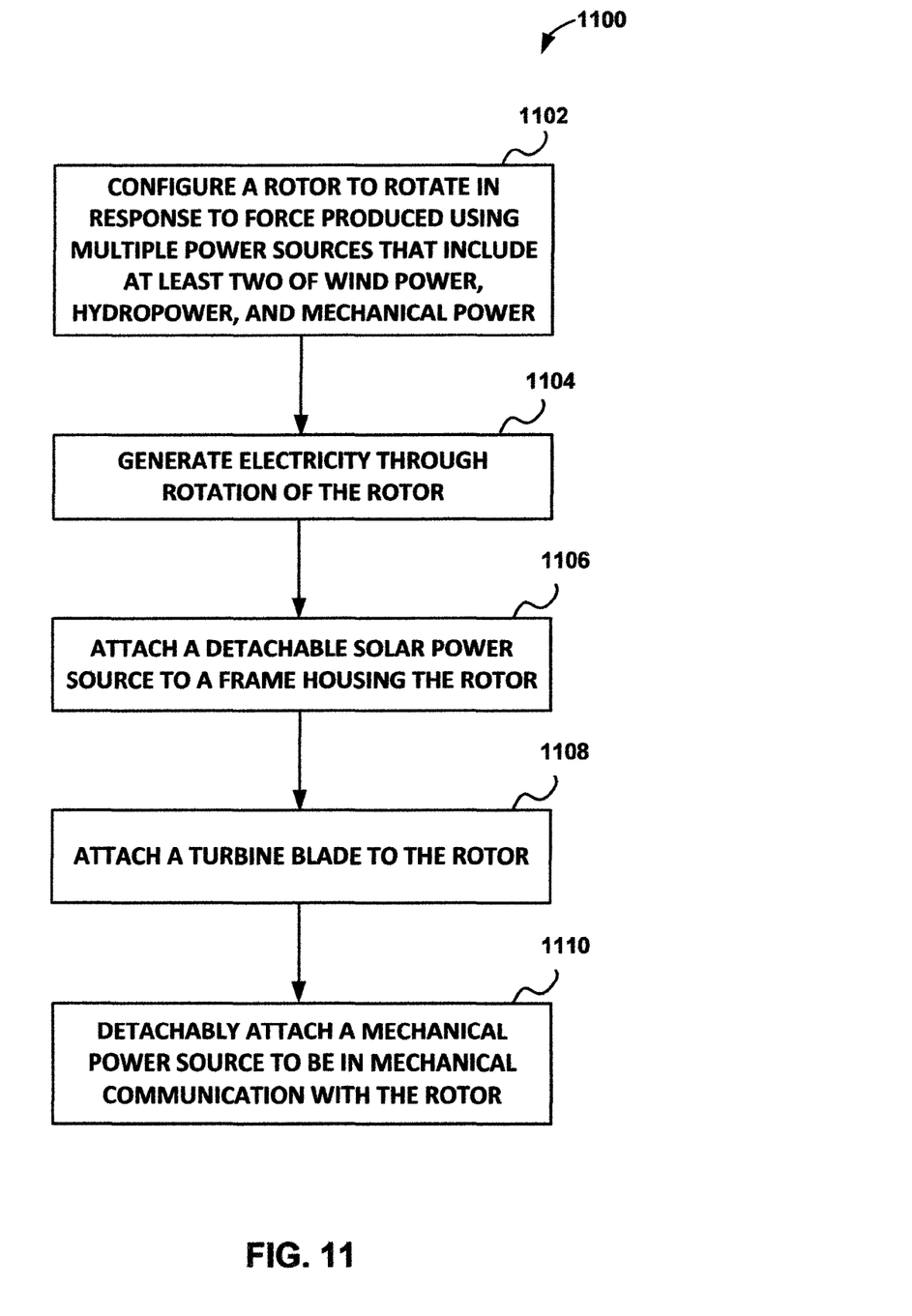
FIG. 11 is a flowchart illustrating an embodiment of another method of producing electrical power.

FIG. 11 is a flowchart illustrating an embodiment of another method of producing electrical power. At 1102, a rotor may be configured to rotate in response to force produced using multiple power sources that include at least two of wind power, hydropower, and mechanical power. At least two of the multiple power sources may be detachably connected to the rotor. Electricity may be generated at 1104 through rotation of the rotor.

At 1106, a detachable solar power source may be attached to a frame housing the rotor. A turbine blade may be attached at 1108 to the rotor. The turbine blade may be configured to translate the force to the rotor. At 110, a mechanical power source may be detachably attached to be in mechanical communication with the rotor. The mechanical power source may include a mechanical structure manipulated by the physical efforts of a human operator.

While the present embodiments have been described in detail, it is not the intention of the Applicant to restrict, or any way limit the scope of the appended claims to such detail. The embodiments in their broader aspects are therefore not limited to the specific details, representative apparatus, methods, and illustrative examples shown and described. Accordingly, departures may be made from such details without departing from the scope of Applicant's general inventive concept.

The invention claimed is:

1. A method of producing electrical power, the method including:
   configuring a single rotor to rotate in response to force produced using multiple power sources comprising: wind power, hydropower, and mechanical power communicated from a manually driven crank or pedal;
   attaching a turbine blade to the rotor, wherein the turbine blade is configured to communicate the force to the rotor, and wherein the turbine blade is responsive to at least one of the wind power, a manually driven crank or pedal, and the hydropower;
   attaching a handle to a frame supporting the rotor, wherein the handle is configured to be carried by hand, and wherein the multiple power sources are hardwired into a circuit of the portable frame in such a manner as a user does not have to separately attach each of the multiple power sources to the frame;
   directing water to the turbine blade in mechanical communication with the rotor via a water storage reservoir;
   connecting a solar panel to the frame; and
   generating electricity through rotation of the rotor and by solar panel.

* * * * *